US012638858B2

(12) United States Patent
Song et al.

(10) Patent No.: US 12,638,858 B2
(45) Date of Patent: May 26, 2026

(54) MOTION CONTROL METHOD FOR ADAPTIVE SELF-RECONFIGURABLE PIPELINE ROBOT BASED ON ENVIRONMENTAL PERCEPTION

(71) Applicant: SOUTHEAST UNIVERSITY, Jiangsu (CN)

(72) Inventors: Aiguo Song, Jiangsu (CN); Tianyuan Miao, Jiangsu (CN); Qinjie Ji, Jiangsu (CN); Shaohu Wang, Jiangsu (CN); Huijun Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 19/274,641

(22) Filed: Jul. 20, 2025

(65) Prior Publication Data

US 2026/0072437 A1 Mar. 12, 2026

Related U.S. Application Data

(63) Continuation of application No. PCT/CN2024/132879, filed on Nov. 19, 2024.

(30) Foreign Application Priority Data

Sep. 11, 2024 (CN) .......................... 202411267028.1

(51) Int. Cl.
| | |
|---|---|
| *B62D 57/028* | (2006.01) |
| *B25J 9/16* | (2006.01) |
| (Continued) | |

(52) U.S. Cl.
CPC ........... *G05D 1/435* (2024.01); *B62D 57/028* (2013.01); *F16L 55/26* (2013.01); *G05D 1/242* (2024.01);
(Continued)

(58) Field of Classification Search
CPC ........ G05D 1/435; G05D 1/242; G05D 1/245; G05D 2101/15; G05D 2107/50;
(Continued)

(56) References Cited

U.S. PATENT DOCUMENTS

| | | | |
|---|---|---|---|
| 6,243,483 B1* | 6/2001 | Petrou | F17D 5/00 |
| | | | 382/103 |
| 7,720,570 B2* | 5/2010 | Close | B25J 9/1617 |
| | | | 405/184.2 |

(Continued)

FOREIGN PATENT DOCUMENTS

| | | |
|---|---|---|
| CN | 107380281 | 11/2017 |
| CN | 110587600 | 12/2019 |

(Continued)

OTHER PUBLICATIONS

Qian Jiawang et al., "Research and Design of a Small Crawler Pipeline Robot", Measurement & Control Technology, Apr. 30, 2024, with English abstract, pp. 1-7, vol. 43, No. 6.

(Continued)

*Primary Examiner* — Jaime Figueroa
(74) *Attorney, Agent, or Firm* — JCIPRNET

(57) ABSTRACT

A motion control method for an adaptive self-reconfigurable pipeline robot based on environmental perception includes: acquiring internal images of the pipeline for scene recognition, segmenting planar surfaces and curved surfaces in the images according to recognition results, and extracting boundary lines of the pipeline; calculating a straight-pipe width, a bent-pipe curvature, a slope angle, and a step height to analyze passability of the robot; designing a path planner and a swing-arm planner to generate a reference trajectory and a swing-arm angle sequence of the robot, performing smoothing, and inputting the reference trajectory and the swing-arm angle sequence into a model predictive control (MPC) motion controller; estimating a position and state of (Continued)

the robot through an Error State Kalman Filter (ESKF) algorithm, and inputting estimation results and collision warning signals into the MPC motion controller; and finally outputting a signal for control of a motor and a swing-arm motor.

7 Claims, 3 Drawing Sheets

(51) Int. Cl.

| | |
|---|---|
| *B25J 11/00* | (2006.01) |
| *F16L 55/26* | (2006.01) |
| *G05D 1/242* | (2024.01) |
| *G05D 1/245* | (2024.01) |
| *G05D 1/435* | (2024.01) |
| *G05D 107/50* | (2024.01) |
| *G06T 7/50* | (2017.01) |
| *G06T 7/62* | (2017.01) |
| *G06T 7/73* | (2017.01) |
| *G06V 10/26* | (2022.01) |
| *G06V 10/30* | (2022.01) |
| *G06V 10/82* | (2022.01) |
| *G06V 20/56* | (2022.01) |
| *G05D 101/15* | (2024.01) |
| *G05D 111/50* | (2024.01) |

(52) U.S. Cl.
CPC .............. *G05D 1/245* (2024.01); *G06T 7/50* (2017.01); *G06T 7/62* (2017.01); *G06T 7/73* (2017.01); *G06V 10/26* (2022.01); *G06V 10/30* (2022.01); *G06V 10/82* (2022.01); *G06V 20/56* (2022.01); *G05D 2101/15* (2024.01); *G05D 2107/50* (2024.01); *G05D 2111/52* (2024.01); *G05D 2111/54* (2024.01); *G06T 2207/20084* (2013.01); *G06T 2207/30252* (2013.01)

(58) Field of Classification Search
CPC ............ G05D 2111/52; G05D 2111/54; B62D 57/028; F16L 55/26; G06T 7/50; G06T 7/62; G06T 7/73; G06T 2207/20084; G06T 2207/30252; G06V 10/26; G06V 10/30; G06V 10/82; G06V 20/56; Y02T 10/40; B25J 5/005; B25J 9/163; B25J 9/1664; B25J 9/1697; B25J 11/00
USPC ................. 700/245–264; 318/568.11–568.25
See application file for complete search history.

(56) References Cited

U.S. PATENT DOCUMENTS

| | | | | |
|---|---|---|---|---|
| 8,024,066 | B2 * | 9/2011 | Reverte ................. | H04N 7/185 |
| | | | | 385/103 |
| 8,060,257 | B2 * | 11/2011 | Close .................... | B25J 9/1617 |
| | | | | 405/184.2 |
| 9,784,599 | B1 * | 10/2017 | Close ...................... | F16L 55/30 |
| 11,143,599 | B2 * | 10/2021 | Morris ................ | G05D 1/0088 |
| 2006/0074525 | A1 * | 4/2006 | Close .................... | B25J 9/1617 |
| | | | | 700/245 |
| 2006/0290779 | A1 * | 12/2006 | Reverte .................... | E03F 7/10 |
| | | | | 348/84 |
| 2010/0191376 | A1 * | 7/2010 | Close .................... | B25J 9/1617 |
| | | | | 700/259 |
| 2020/0173935 | A1 * | 6/2020 | Morris ................ | B62D 55/065 |
| 2025/0164412 | A1 * | 5/2025 | Shen ................... | G01N 21/954 |
| 2025/0277555 | A1 * | 9/2025 | Tan ........................ | F16L 55/40 |

FOREIGN PATENT DOCUMENTS

| | | |
|---|---|---|
| CN | 115451239 | 12/2022 |
| CN | 115639823 | 1/2023 |
| CN | 116026315 | 4/2023 |
| CN | 117970925 | 5/2024 |
| CN | 118192597 | 6/2024 |
| CN | 118769209 | 10/2024 |
| WO | 2021152047 | 8/2021 |

OTHER PUBLICATIONS

"International Search Report (Form PCT/ISA/210) of PCT/CN2024/132879," mailed on May 14, 2025, pp. 1-4.
"Written Opinion of the International Searching Authority (Form PCT/ISA/237) of PCT/ CN2024/132879," mailed on May 14, 2025, pp. 1-4.

* cited by examiner (a)

(b)

(c)

(d)

MOTION CONTROL METHOD FOR ADAPTIVE SELF-RECONFIGURABLE PIPELINE ROBOT BASED ON ENVIRONMENTAL PERCEPTION

CROSS-REFERENCE TO RELATED APPLICATION

This application is continuation of international application of PCT application NO. PCT/CN2024/132879 filed on Nov. 19, 2024 which claims the priority benefit of China application No. 202411267028.1 filed on Sep. 11, 2024. The entirety of each of the above-mentioned patent applications is hereby incorporated by reference herein and made a part of this specification.

TECHNICAL FIELD

The present disclosure relates to the technical field of robots, and in particular to a motion control method for an adaptive self-reconfigurable pipeline robot based on environmental perception.

BACKGROUND

Ventilation ducts are important infrastructure in factories and high-rise buildings. Contaminant accumulation and corrosion inside such ducts may cause respiratory infections and other diseases. However, since ventilation ducts are usually located in building interlayers or at elevated heights, some challenges exist in inspection and maintenance. Development of pipeline robots to replace manual pipeline inspections is a current development trend.

In complex pipeline environments, pipeline robots need to traverse various terrain scenes such as straight pipes, bent pipes, slopes, steps, and the like. Especially for narrow environments, operators need to have high operational proficiency, and may make misoperations due to blind spots and excessive fatigue during long-term inspections. Currently, autonomous inspection and autonomous motion control of robots have been extensively studied in conventional ground environments. However, in narrow pipeline environments, on the one hand, the accuracy of perception and localization systems in the prior art is affected by factors such as high reflectivity and low texture of the pipeline environment. On the other hand, pipeline robots need to automatically adjust configurations to adapt to various terrain scenes, and learning-based and model-based methods are only applied to single scenes and have poor robustness. Therefore, methods in the prior art cannot achieve autonomous inspection and adaptive motion control of robots in pipeline environments.

The Chinese Patent Application No. CN202211176185.2, authorized on Jul. 4, 2023, discloses an autonomous intelligent pipeline inspection robot. A toe angle is adjusted by a toe control panel to realize automatic main busbar tracking of the pipeline robot at various operating speeds. A Hall sensor is used for counting and distance measurement, which avoids measurement errors caused by wear or failure of an inner wall of the pipeline under relatively poor working conditions. However, in a smooth pipeline environment, mileage errors caused by slippage cannot be eliminated, and toe angle adjustment is only applicable to the autonomous motion in the straight-pipe scenes.

The Chinese Patent Application No. CN201710719668.5, authorized on Jun. 20, 2023, discloses an adaptive crawler traveling system and an adaptive crawler robot. When encountering obstacles, the adaptive crawler robot automatically reconfigures the shape of a crawler belt through a suspension mechanism to adapt to the changing terrain. The patent has the characteristics of simple structure and strong adaptability. However, this passive adaptation approach is only applicable to scenes of straight-line traveling with small terrain undulations, and cannot solve the problems of adaptive motion control in turning or step-crossing scenes.

Currently, how to leverage data acquired from multi-sensor devices to design a method for adaptive reconfiguration of pipeline robots to achieve autonomous inspections of robots in various pipeline scenes remains an urgent problem to be solved.

SUMMARY

In order to solve the above technical problems, the present disclosure provides a motion control method for an adaptive self-reconfigurable pipeline robot based on environmental perception. The pipeline robot is a dual-swing-arm crawler mechanism, and the sensing equipment equipped thereon includes a depth camera, an inertial measurement unit (IMU), a wheel speed sensor, and three Time-of-Flight (TOF) modules for distance measurement, where the depth camera is installed just in front of the robot, and the three TOF modules are respectively installed on the left and right sides and the top of the robot. A multi-sensor fusion approach is used to perceive the pipeline environment and the robot state, and a method for adaptive reconfiguration of pipeline robots is provided to realize autonomous inspections of robots in various pipeline scenes.

In order to achieve the above objective, the present disclosure provides a technical solution as follows:

a motion control method for an adaptive self-reconfigurable pipeline robot based on environmental perception includes the following steps:

step 1: placing a pipeline robot in a pipeline, using the depth camera to acquire images of the pipeline in front, recognizing a scene of the pipeline through a neural network after denoising and preprocessing the images, segmenting planar surfaces and curved surfaces in the images according to recognition results, projecting segmentation results of regions on the 2D images into a 3D space through a camera projection model, and extracting boundary lines of the pipeline;

step 2: calculating a straight-pipe width, a bent-pipe curvature, a slope angle, and a step height according to features of the boundary lines to analyze passability of the robot;

step 3: designing a path planner and a swing-arm planner to generate a reference trajectory and a swing-arm angle sequence of the robot, performing smoothing, and inputting the reference trajectory and the swing-arm angle sequence into a model predictive control (MPC) motion controller;

step 4: estimating a position and state of the robot through an Error State Kalman Filter (ESKF) algorithm according to data from the depth camera, the IMU, and the wheel tachometer, and inputting estimation results and collision warning signals from the TOF modules into the MPC motion controller in real time; and step 5: constructing a quadratic objective function through a kinematic model of the dual-swing-arm crawler robot in combination with the reference trajectory and the swing-arm angle sequence in the MPC motion controller, solving through an iterative method, and outputting a signal for adaptive motion control of the robot.

Further, the pipeline robot is a dual-swing-arm crawler mechanism, and the sensing equipment equipped thereon includes a depth camera, an inertial measurement unit (IMU), a wheel speed sensor, and three Time-of-Flight (TOF) modules for distance measurement, where the depth camera is installed just in front of the robot, and the three TOF modules are respectively installed on the left and right sides and the top of the robot.

Further, the step 1 specifically includes the following steps:

acquiring images of a rectangular pipeline through the depth camera, performing denoising and strong light suppression on the images through bilateral filtering and backlight compensation sequentially, completing preprocessing of the images, and using a lightweight ResNet18 neural network to perform scene recognition based on the processed images, where four scenes are classified according to recognition results: a straight-pipe scene, a bent-pipe scene, a slope scene, and a step scene; using a DeepLabv3 network to segment a 2D image into a plurality of planar regions P and curved surface regions S according to classification results; randomly selecting three points on each region along an x axis of a pixel coordinate system, and converting a selected point $p_{uv}$ in the pixel coordinate system to $p_C$ in a camera coordinate system according to an intrinsic matrix K of the depth camera and scale information Z from the depth camera:

$$Zp_{uv} = Kp_C$$

fitting equations of each planar region $P_i$ and each curved surface region $S_j$ in space according to 3D coordinates of sampling points in each region in combination with geometric structural features of the pipeline environment; and calculating a spatial equation of each straight line or curved line according to a regional equation, where boundary lines of the pipeline formed by intersections of each region are straight lines or curved lines.

Further, the step 2 specifically includes the following steps:

a measured length, width, and height of the pipeline robot are denoted as $L_l, L_w, L_h$, a radius of a driving wheel is denoted as R, a radius of a driven wheel on a swing arm is denoted as r, a wheelbase of a rear swing arm is denoted $l_F$, a wheelbase of a front swing arm is denoted as as $l_R$, and a wheelbase of a traveling main body is denoted as $l_B$; after obtaining an equation of each boundary line, calculating a width of the pipeline using two straight lines on a bottom surface of the pipeline in a straight-pipe scene according to geometric characteristics of the pipeline, calculating a height of the pipeline using two straight lines on a side surface of the pipeline, and identifying the passability of the straight-pipe scene in front according to results of comparison with outer envelope dimensions of the robot; calculating an angle between side boundary lines as a slope angle $\theta_s$ of a slope environment, where a coefficient of friction between the robot and a wall surface of the pipeline is denoted as $\mu$, and when $\arctan(\mu) < \theta_s$, the slope in front is deemed passable; calculating a distance between a boundary line on a step surface and a boundary line on the bottom surface of the pipeline in the step scene to obtain a step height H, and when $$l_R + r + \frac{l_B \sin\alpha}{2} - \frac{R}{\cos\alpha} > H,$$

the step in front is deemed passable, $$\alpha \in \left(0, \arccos\frac{R}{2l_B}\right);$$

calculating an inner curvature $\lambda_{in}$ and an outer curvature $\lambda_{out}$ of a pipe bend using two curved lines on the bottom surface of the pipeline in the bent-pipe scene, and then identifying passability conditions of the bent pipe:

$$\begin{cases} L_w < 1/\lambda_{out} - 1/\lambda_{in} \\ L_1 < 2\sqrt{(1/\lambda_{out})^2 + (1/\lambda_{in} + L_w)^2} \end{cases}.$$

Further, the step 3 specifically includes the following steps:

arranging only a traveling crawler for the motion control in the straight-pipe scene and the bent-pipe scene, designing the path planner to calculate equidistant lines of left and right side boundary lines as a reference trajectory for traveling of the robot, and performing sampling and smoothing; adjusting angles of front and rear swing arms simultaneously while controlling the traveling crawler in the slope scene and the step scene; and simplifying the kinematic model of the dual-swing-arm crawler pipeline robot into a contact boundary line model, where the contact boundary line model is composed of a front swing-arm contact boundary line $l_f$, a rear swing-arm contact boundary line $l_r$, and a chassis contact boundary line $l_b$;

$$\theta_f = \arccos(l_R/(R-r)) + \theta_F$$

$$\theta_r = \arccos(l_R/(R-r)) + \theta_R$$

$$l_f = \sqrt{l_R^2 - (R-r)^2} + R\arctan\left(\frac{\pi - \theta_f}{2}\right)$$

$$l_r = \sqrt{l_R^2 - (R-r)^2} + R\arctan\left(\frac{\pi - \theta_r}{2}\right)$$

$$l_b = l_B + R\arctan\left(\frac{\pi - \theta_f}{2}\right) + R\arctan\left(\frac{\pi - \theta_r}{2}\right)$$

endpoints on two sides of $l_r$ are denoted as $p_r$ and $p_{br}$, endpoints on two sides of $l_f$ are denoted as $p_f$ and $p_{bf}$, endpoints on two sides of $l_b$ are denoted as $p_{br}$ and $p_{bf}$, an included angle between $l_r$ and $l_b$ is denoted as $\theta_r$, and an included angle between $l_f$ and $l_b$ is denoted as $\theta_f$; using the simplified model for terrain contact, calculating $\theta_r$ and $\theta_f$ during traveling, and mapping same to the swing-arm joint angles $\theta_R$ and $\theta_F$ to complete the control of the swing arms.

Further, solving $\theta_r$ and $\theta_f$ in the step 3 is subjected to the following constraints:

1) at least two points on three simplified boundary lines are in contact with the terrain;
2) the three simplified boundary lines are free from interference with the terrain;
3) a vertical line of the robot's center of gravity is between $p_{br}$ and $p_{bf}$;

when $\theta_r$ and $\theta_f$ have a plurality of solutions, taking a state of the robot with a lowest height of the center of gravity as an optimal state; after obtaining the swing-arm angle sequence in a discrete state during obstacle crossing, calculating a motion cost according to a swing-arm angle change rate, reducing a cumulative cost through a dynamic programming algorithm, obtaining an optimal discrete swing-arm angle sequence, and performing sampling and smoothing on the generated optimal discrete swing-arm state sequence through a Bezier curve; and sending a smoothed reference path and swing-arm angle to the MPC motion controller.

Further, the step 4 specifically includes the following steps:

in order to obtain a real-time position and state of the robot, deriving ESKF motion equations for a nominal state and an error state in discrete time using an IMU measurement model, then performing an ESKF prediction, including predictions of the nominal state and the error state, obtaining left and right crawler speeds through an encoder in an update stage, observing and measuring a distance between a pipeline joint and a vehicle body in order to mitigate cumulative errors, and completing the update of a covariance matrix and the error state; calculating the distance between the pipeline joint and the vehicle body according to boundary line features of the pipeline joint extracted by the depth camera in combination with rectangular constraints and the camera projection model; the TOF modules for distance measurement are respectively installed on the left and right sides and the top of the robot and configured for collision warning; and inputting the real-time position and state of the robot and a collision warning signal into the MPC motion controller.

Further, the step 5 specifically includes the following steps:

setting a system state as $x=[x_r, y_r, z_r, \theta_{yaw}, \theta_{pitch}, \theta_F, \theta_R]^T$, where $x_r$, $y_r$, $z_r$, $\theta_{yaw}$, $\theta_{pitch}$, represent 3D spatial coordinates, a yaw angle, and a pitch angle of the robot respectively; a system input is denoted as $u=[v_L, v_R, \Delta\theta_F, \Delta\theta_R]^T$, where $v_L, v_R$, $\Delta\theta_F, \Delta\theta_R$ represent an input velocity of a left crawler, an input velocity of a right crawler, an angular increment of the front swing arm, and an angular increment of the rear swing arm respectively; a reference state is denoted as $X_{ref}=\{x_0, x_1, x_2, \ldots, x_{end}\}$, where $x_0$ signifies an initial state of the system, and $x_{end}$ represents a desired final state of the system; predicting states of the system in next N cycles at a moment i through the kinematic model f of the dual-swing-arm crawler robot according to the formula $$X_{pre}_{i+1\rightarrow i+N} = f(u_{i\rightarrow i+N-1}, x_i),$$

constructing the quadratic objective function according to differences between predicted states and reference states, and iteratively optimizing to minimize the differences, so as to obtain an optimized system input $u_{i\rightarrow i+N-1}$ for N cycles; in the process of updating states of the system, using the position and state of the robot obtained in the step 4 to obtain more accurate 3D spatial coordinates of the robot; and optimizing the system input u through a sliding window in real time.

Compared with the prior art, the present disclosure has the following beneficial effects:

1. The present disclosure employs 2D image region segmentation technology and the camera projection model to obtain regional spatial equations, derives regional spatial equations of intersecting straight lines or curved lines according to geometric structure features of the pipeline environments, and further derives a simplified spatial configuration of the pipeline. Compared with the method for directly extracting the boundary line features of 2D images, the method of the present disclosure is used to analyze the robot's passability and generate the reference motion trajectory, enables more accurate extraction of boundary lines, and has enhanced robustness and immunity to strong light reflection from inner walls of the pipeline.

2. The present disclosure defines multi-scene passability constraints of the robot, and enables to analyze the stability of the center of gravity of the pipeline robot through the kinematic model of the pipeline robot according to features of spatial boundary lines, which avoids the operator's wrong determination of the robot's passability.

3. The present disclosure employs the contact boundary line model to simplify the contact motion between the robot and the terrain, designs the path planner and the swing-arm planner to generate the reference trajectory and the swing-arm angle sequence, fuses data from the depth camera, the IMU, and the wheel speed sensor through the ESKF algorithm, and estimates the position and state of the robot. The present disclosure inputs estimation results and collision warning signals from the TOF modules into the MPC motion controller in real time, constructs the quadratic objective function, iteratively optimizes input control signals, and achieves adaptive self-reconfigurable motion control of the pipeline robot, which helps to improve the efficiency of autonomous inspection.

DETAILED DESCRIPTIONS OF THE EMBODIMENTS

The present disclosure will be further described in detail with reference to the accompanying drawings and specific embodiments.

Figure 1:
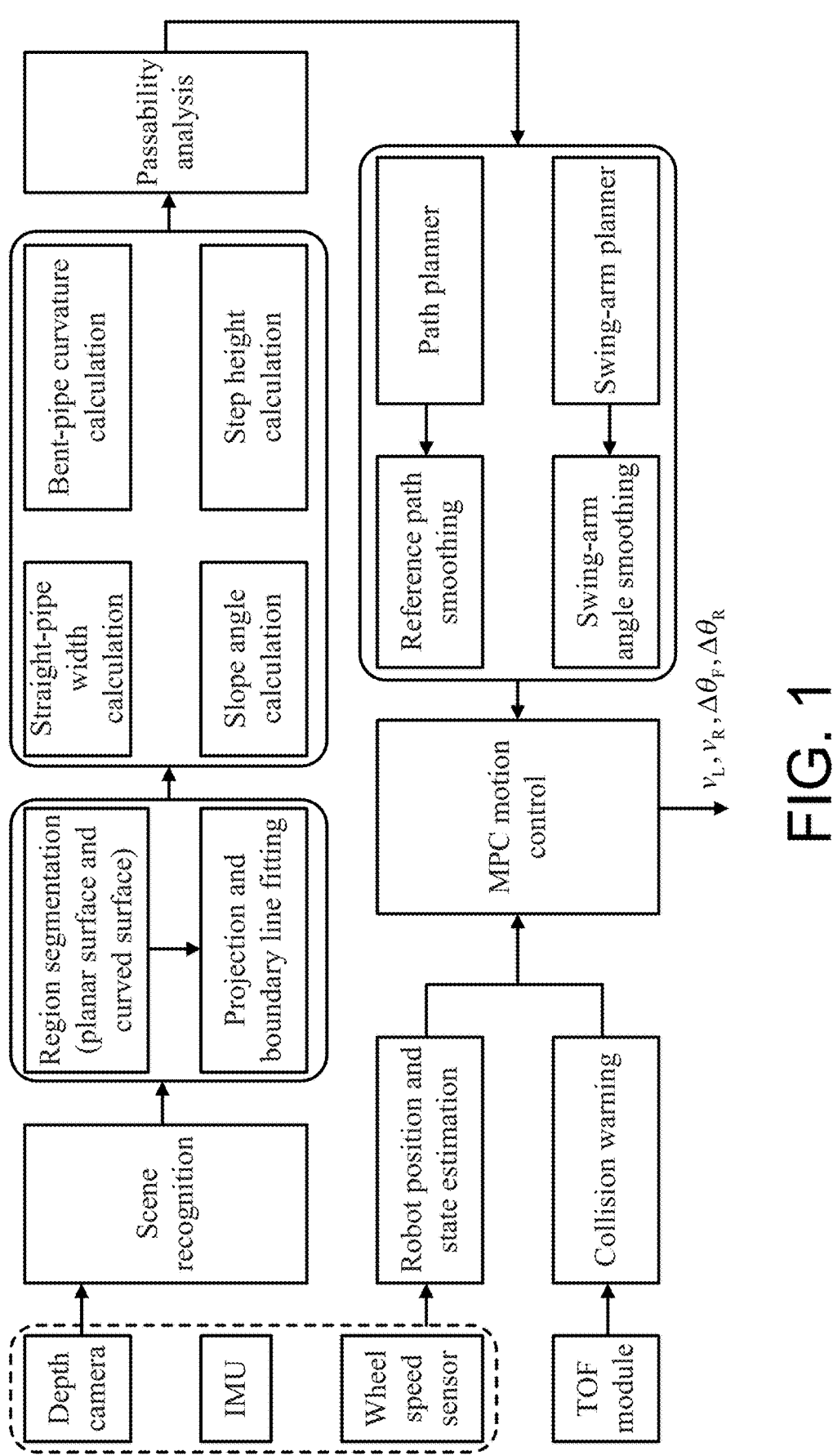
FIG. 1 illustrates a framework diagram of a motion control method for an adaptive self-reconfigurable pipeline robot based on environmental perception provided by the present disclosure.

The present disclosure provides a motion control method for an adaptive self-reconfigurable pipeline robot based on environmental perception, and the method includes the following steps:

step 1: place the pipeline robot in a pipeline, using the depth camera to acquire images of the pipeline in front, recognize a scene of the pipeline through a neural network after denoising and preprocessing on the images, segment planar surfaces and curved surfaces in the images according to recognition results, project segmentation results of regions on the 2D images into a 3D space through a camera projection model, and extract boundary lines of the pipeline;

step 2: calculate a straight-pipe width, a bent-pipe curvature, a slope angle, and a step height according to features of the boundary lines to analyze passability of the robot;

step 3: design a path planner and a swing-arm planner to generate a reference trajectory and a swing-arm angle sequence of the robot, perform smoothing, and input the reference trajectory and the swing-arm angle sequence into a model predictive control (MPC) motion controller;

step 4: estimate a position and state of the robot through an Error State Kalman Filter (ESKF) algorithm according to data from the depth camera, the IMU, and the wheel speed sensor, and input estimation results and collision warning signals from the TOF modules into the MPC motion controller in real time; and step 5: construct a quadratic objective function through a kinematic model of the dual-swing-arm crawler robot in combination with the reference trajectory and the swing-arm angle sequence in the MPC motion controller, solve through an iterative method, and output a signal for adaptive motion control of the robot, where a framework of the motion control method for the robot is shown in FIG. 1.

First, process the images of a rectangular pipeline acquired through the depth camera, perform denoising and strong light suppression on the images through bilateral filtering and backlight compensation sequentially, and complete preprocessing of the images;

use a lightweight ResNet18 neural network to perform scene recognition based on the processed images, where four scenes are classified according to recognition results: a straight-pipe scene, a bent-pipe scene, a slope scene, and a step scene;

use a DeepLabv3 network to segment a 2D image into a plurality of planar regions P and curved surface regions S according to classification results;

randomly select three points on each region along an axis x of a pixel coordinate system, and convert a selected point $p_{uv}$ in the pixel coordinate system to $p_C$ in a camera coordinate system of the camera according to an intrinsic matrix K and scale information Z from the depth camera;

$$Zp_{uv} = Kp_C; \qquad (1)$$

fit equations of each planar region $P_i$ and each curved surface region $S_j$ in space according to 3D coordinates of sampling points in each region in combination with geometric structural features of the pipeline environment; and calculate a spatial equation of each straight line or curved line according to a regional equation, where boundary lines of the pipeline formed by intersections of each region are straight lines or curved lines.

a measured length, width, and height of the pipeline robot are denoted as $L_l, L_w, L_h$, a radius of a driving wheel is denoted as R, a radius of a driven wheel on a swing arm is denoted as r, a wheelbase of a front swing arm is denoted as $l_F$, a wheelbase of a rear swing arm is denoted as $l_R$, and a wheelbase of a traveling main body is denoted as $l_B$ after obtaining an equation of each boundary line, calculate a width of the pipeline using two straight lines on a bottom surface of the pipeline in a straight-pipe scene according to geometric characteristics of the pipeline, calculate a height of the pipeline using two straight lines on a side surface of the pipeline, and identify the passability of the straight-pipe scene in front according to results of comparison with outer envelope dimensions of the robot;

calculate an angle between side boundary lines as a slope angle $\theta_s$ of a slope environment, where a coefficient of friction between the robot and a wall surface of the pipeline is denoted as $\mu$, and when $\arctan(\mu) < \theta_s$, the slope in front is deemed passable;

calculate a distance between a boundary line on a step surface and a boundary line on the bottom surface of the pipeline in the step scene to obtain a step height H, and when $$l_R + r + \frac{l_B \sin\alpha}{2} - \frac{R}{\cos\alpha} > H,$$

the step in front is deemed passable, $$\alpha \in \left(0, \arccos\frac{R}{2l_B}\right);$$

calculate an inner curvature $\lambda_{in}$ and an outer curvature $\lambda_{out}$ of a pipe bend using two curved lines on the bottom surface of the pipeline in the bent-pipe scene, and then identify passability conditions of the bent pipe:

$$\begin{cases} L_w < 1/\lambda_{out} - 1/\lambda_{in} \\ L_1 < 2\sqrt{(1/\lambda_{out})^2 + (1/\lambda_{in} + L_w)^2} \end{cases}; \qquad (2)$$

Figure 2:
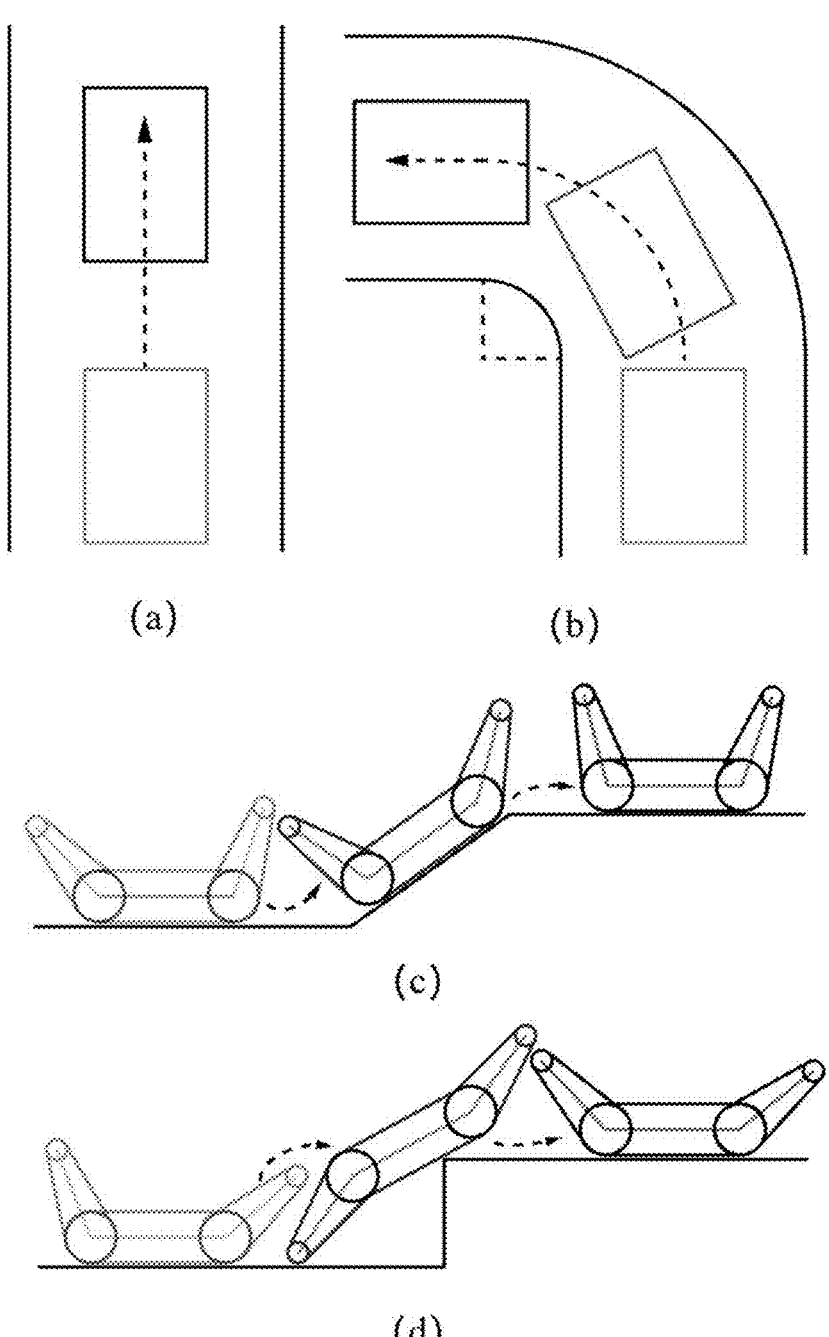
FIG. 2 illustrates trajectories and swing arm planning of a dual-swing-arm crawler pipeline robot in a straight-pipe scene, a bent-pipe scene, a slope scene, and a step scene, where (a) illustrates straight-pipe motion planning, (b) illustrates bent-pipe motion planning, (c) illustrates slope motion planning, and (d) illustrates step motion planning.

FIG. 2 illustrates trajectories and swing arm planning of a dual-swing-arm crawler pipeline robot in a straight-pipe scene, a bent-pipe scene, a slope scene, and a step scene, where (a) illustrates straight-pipe motion planning, (b) illustrates bent-pipe motion planning, (c) illustrates slope motion planning, and (d) illustrates step motion planning.

Figure 3:
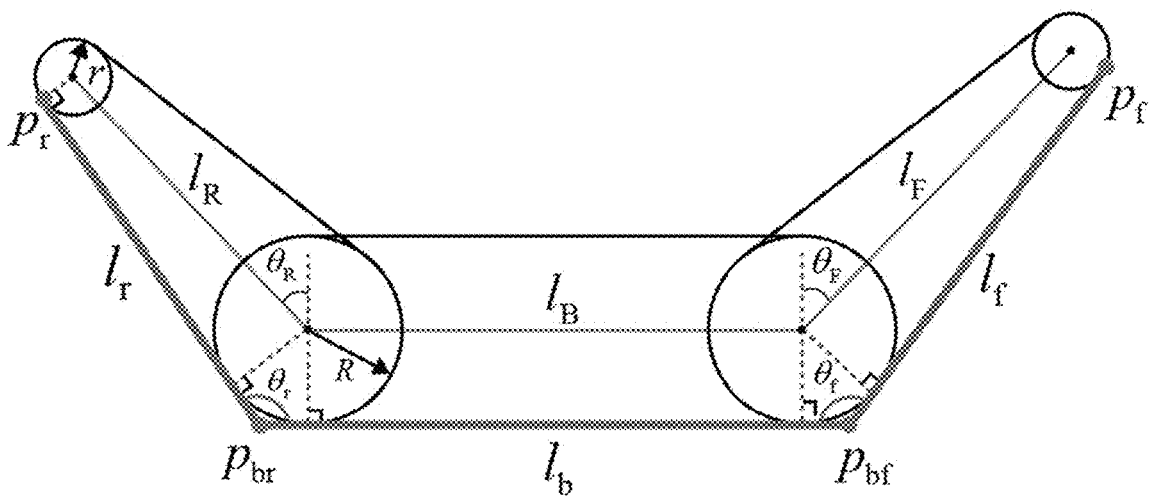
FIG. 3 illustrates a schematic diagram of simplifying a dual-swing-arm crawler pipeline robot model into a contact boundary line model.
Figure 4:
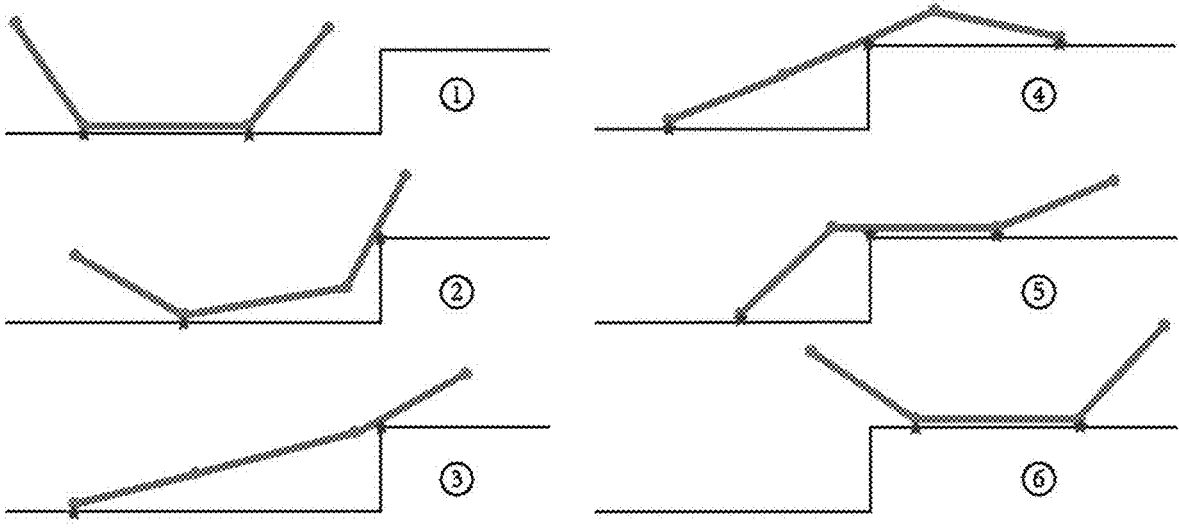
FIG. 4 illustrates a schematic diagram of a simplified contact boundary line model for robots passing through a step in six stages.

Arrange only a traveling crawler for the motion control in the straight-pipe scene and the bent-pipe scene, design the path planner to calculate equidistant lines of left and right side boundary lines as a reference trajectory for traveling of the robot, and perform sampling and smoothing;

adjust angles of front and rear swing arms simultaneously while controlling the traveling crawler in the slope scene and the step scene; and simplifying the kinematic model of the dual-swing-arm crawler pipeline robot into a contact boundary line model, where as shown in FIG. 3, the contact boundary line model is mainly composed of a front swing-arm contact boundary line $l_f$, a rear swing-arm contact boundary line $l_r$, and a chassis contact boundary line $l_b$;

$$\theta_f = \arccos(l_R/(R-r)) + \theta_F \quad (3)$$

$$\theta_r = \arccos(l_R/(R-r)) + \theta_R$$

$$l_f = \sqrt{l_R{}^2 - (R-r)^2} + R\arctan\left(\frac{\pi - \theta_f}{2}\right)$$

$$l_r = \sqrt{l_R{}^2 - (R-r)^2} + R\arctan\left(\frac{\pi - \theta_r}{2}\right)$$

$$l_b = l_B + R\arctan\left(\frac{\pi - \theta_f}{2}\right) + R\arctan\left(\frac{\pi - \theta_r}{2}\right);$$

endpoints on two sides of $l_r$ are denoted as $p_r$ and $p_{br}$, endpoints on two sides of $l_f$ are denoted as $p_f$ and $p_{bf}$, endpoints on two sides of $l_b$ are denoted as $p_{br}$ and $p_{bf}$, an included angle between $l_r$ and $l_b$ is denoted as $\theta_r$, and an included angle between $l_f$ and $l_b$ is denoted as $\theta_f$; use the simplified model for terrain contact, calculate $\theta_r$ and $\theta_f$ during traveling, and map same to the swing-arm joint angles $\theta_R$ and $\theta_F$, to complete the control of the swing arms;

solving $\theta_r$ and $\theta_f$ is subjected to the following constraints: 1) at least two points on three simplified boundary lines are in contact with the terrain; 2) the three simplified boundary lines are free from interference with the terrain; and 3) a vertical line of the robot's center of gravity is between $p_{br}$ and $p_{bf}$;

when $\theta_r$ and $\theta_f$ have a plurality of solutions, take a state of the robot with a lowest height of the center of gravity as an optimal state; and FIG. 4 illustrates a schematic diagram of a simplified boundary line model for robots passing through a step in six stages.

After obtaining the swing-arm angle sequence in a discrete state during obstacle crossing, calculate a motion cost according to a swing-arm angle change rate, reduce a cumulative cost through a dynamic programming algorithm, obtain an optimal discrete swing-arm angle sequence, and perform sampling and smoothing on the generated optimal discrete swing-arm state sequence through a Bezier curve; and send a smoothed reference path and swing-arm angle to the MPC motion controller.

In order to obtain a real-time position and state of the robot, derive ESKF motion equations for a nominal state and an error state in discrete time using an IMU measurement model, and then perform an ESKF prediction, including predictions of the nominal state and the error state;

obtain left and right crawler speeds through an encoder in an update stage, observe and measure a distance between a pipeline joint and a vehicle body in order to mitigate cumulative errors, and complete the update of a covariance matrix and the error state; calculate the distance between the pipeline joint and the vehicle body according to boundary line features of the pipeline joint extracted by the depth camera in combination with rectangular constraints and the camera projection model; and the TOF modules for distance measurement are respectively installed on the left and right sides and the top of the robot and configured for collision warning; and input the real-time position and state of the robot and a collision warning signal into the MPC motion controller.

Set a system state as $x=[x_r, y_r, z_r, \theta_{yaw}, \theta_{pitch}, \theta_F, \theta_R]^T$, where $x_r, y_r, z_r, \theta_{yaw}, \theta_{pitch}$ represent 3D spatial coordinates, a yaw angle, and a pitch angle of the robot respectively; a system input is denoted as $u=[v_L, v_R, \Delta\theta_F, \Delta\theta_R]^T$, where $v_L, v_R, \Delta\theta_F, \Delta\theta_R$ represent an input velocity of a left crawler, an input velocity of a right crawler, an angular increment of the front swing arm, and an angular increment of the rear swing arm respectively; a reference state is denoted as $X_{ref}=\{x_0, x_1, x_2, \ldots, x_{end}\}$, where $x_0$ signifies an initial state of the system, and $x_{end}$ represents a desired final state of the system;

predict states of the system in next N cycles at a moment i through the kinematic model f of the dual-swing-arm crawler robot according to the formula $$X_{pre \atop i+1 \to i+N} = f(u_{i \to i+N-1}, x_i),$$

construct the quadratic objective function according to differences between predicted states and reference states, and iteratively optimize to minimize the differences, so as to obtain an optimized system input $u_{i \to i+N-1}$ for N cycles; and in the process of updating states of the system, use the position and state of the robot obtained in the step 4 to obtain more accurate 3D spatial coordinates of the robot; and optimize the system input u through a sliding window in real time.

The foregoing descriptions are merely preferred examples of the present disclosure, and are not intended to impose any formal restrictions on the present disclosure. Any modifications or equivalent variations made based on the technical essence of the present disclosure still fall within the protection scope of the present disclosure.

What is claimed is:

1. A motion control method for an adaptive self-reconfigurable pipeline robot based on environmental perception, comprising the following steps:

step 1: placing a pipeline robot in a pipeline, using a depth camera to acquire images of the pipeline in front, recognizing a scene of the pipeline through a neural network after denoising and preprocessing on the images, segmenting planar surfaces and curved surfaces in the images according to recognition results, projecting segmentation results of regions on 2D images into a 3D space through a camera projection model, and extracting boundary lines of the pipeline;

step 2: calculating a straight-pipe width, a bent-pipe curvature, a slope angle, and a step height according to features of the boundary lines to analyze passability of the robot;

step 3: designing a path planner and a swing-arm planner to generate a reference trajectory and a swing-arm angle sequence of the robot, performing smoothing, and inputting the reference trajectory and the swing-arm angle sequence into a model predictive control (MPC) motion controller;

step 4: estimating a position and state of the robot through an Error State Kalman Filter (ESKF) algorithm according to data from the depth camera, an inertial measurement unit (IMU), and a wheel speed sensor, and inputting estimation results and collision warning signals from Time-of-Flight (TOF) modules into the MPC motion controller in real time; and step 5: constructing a quadratic objective function through a kinematic model of a dual-swing-arm crawler robot in combination with the reference trajectory and the swing-arm angle sequence in the MPC motion controller, solving through an iterative method, and outputting a signal for adaptive motion control of the robot;

wherein a measured length, width, and height of the pipeline robot are denoted as $L_l$, $L_w$, $L_h$, a radius of a driving wheel is denoted as R, a radius of a driven wheel on a swing arm is denoted as r, a wheelbase of a front swing arm is denoted as $l_F$, a wheelbase of a rear-swing arm is denoted as $l_R$, and a wheelbase of a traveling main body is denoted as $l_B$, wherein the step 2 comprises:

after obtaining an equation of each boundary line, calculating a width of the pipeline using two straight lines on a bottom surface of the pipeline in a straight-pipe scene according to geometric characteristics of the pipeline, calculating a height of the pipeline using two straight lines on a side surface of the pipeline, and identifying passability of the straight-pipe scene in front according to results of comparison with outer envelope dimensions of the robot; and calculating an angle between side boundary lines as a slope angle $\theta_s$ of a slope environment, wherein a coefficient of friction between the robot and a wall surface of the pipeline is denoted as $\mu$, and when $\arctan(\mu) < \theta_s$, the slope in front is deemed passable; calculating a distance between a boundary line on a step surface and a boundary line on the bottom surface of the pipeline in the step scene to obtain a step height H, and when $$l_R + r + \frac{l_B \sin\alpha}{2} - \frac{R}{\cos\alpha} > H,$$

the step in front is deemed passable, $$\alpha \in \left(0, \arccos\frac{R}{2l_B}\right);$$

calculating an inner curvature $\lambda_{in}$ and an outer curvature $\lambda_{out}$ of a pipe bend using two curved lines on the bottom surface of the pipeline in the bent-pipe scene, and then identifying passability conditions of the bent pipe:

$$\begin{cases} L_w < 1/\lambda_{out} - 1/\lambda_{in} \\ L_1 < 2\sqrt{(1/\lambda_{out})^2 + (1/\lambda_{in} + L_w)^2} \end{cases}.$$

2. The motion control method for the adaptive self-reconfigurable pipeline robot based on environmental perception according to claim 1, wherein the pipeline robot is a dual-swing-arm crawler mechanism, and sensing equipment equipped thereon comprises the depth camera, the IMU, the wheel speed sensor, and three TOF modules for distance measurement, wherein the depth camera is installed just in front of the robot, and the three TOF modules are installed on left and right sides and a top of the robot.

3. The motion control method for the adaptive self-reconfigurable pipeline robot based on environmental perception according to claim 1, wherein the step 1 comprises:

acquiring images of a rectangular pipeline through the depth camera, performing denoising and strong light suppression on the images through bilateral filtering and backlight compensation sequentially, completing preprocessing of the images, and using a lightweight ResNet18 neural network to perform scene recognition based on the processed images, wherein four scenes are classified according to recognition results: a straight-pipe scene, a bent-pipe scene, a slope scene, and a step scene;

using a DeepLabv3 network to segment a 2D image into a plurality of planar regions P and curved surface regions S according to classification results;

randomly selecting three points on each region along an X axis of a pixel coordinate system, and converting a selected point $P_{uv}$ in the pixel coordinate system to $P_C$ in a camera coordinate system according to an intrinsic matrix K of the depth camera and scale information Z from the depth camera:

$$Zp_{uv} = Kp_C;$$

and fitting equations of each planar region $P_i$ and each curved surface region $S_j$ in space according to 3D coordinates of sampling points in each region in combination with geometric structural features of a pipeline environment; and calculating a spatial equation of each straight line or curved line according to a regional equation, wherein boundary lines of the pipeline formed by intersections of each region are straight lines or curved lines.

4. The motion control method for the adaptive self-reconfigurable pipeline robot based on environmental perception according to claim 1, wherein the step 3 comprises:

arranging only a traveling crawler for the motion control in the straight-pipe scene and the bent-pipe scene, designing the path planner to calculate equidistant lines of left and right side boundary lines as a reference trajectory for traveling of the robot, and performing sampling and smoothing; adjusting angles of front and rear swing arms simultaneously while controlling the traveling crawler in the slope scene and the step scene; and simplifying the kinematic model of the dual-swing-arm crawler pipeline robot into a contact boundary line model, wherein the contact boundary line model is composed of a front swing-arm contact boundary line $l_f$, a rear swing-arm contact boundary line $l_r$, and a chassis contact boundary line $l_b$:

$$\theta_f = \arccos(l_R/(R - r)) + \theta_F$$

$$\theta_r = \arccos(l_R/(R - r)) + \theta_R$$

$$l_f = \sqrt{l_R^2 - (R - r)^2} + R\arctan\left(\frac{\pi - \theta_f}{2}\right)$$

$$l_r = \sqrt{l_R^2 - (R - r)^2} + R\arctan\left(\frac{\pi - \theta_r}{2}\right)$$

$$l_b = l_B + R\arctan\left(\frac{\pi - \theta_f}{2}\right) + R\arctan\left(\frac{\pi - \theta_r}{2}\right)$$

endpoints on two sides of $l_r$ are denoted as $P_r$ and $P_{br}$, endpoints on two sides of $l_f$ are denoted as $P_f$ and $P_{bf}$, endpoints on two sides of $l_b$ are denoted as $P_{br}$ and $P_{bf}$, an included angle between $l_r$ and $l_b$ is denoted as $\theta_r$, and an included angle between $l_f$ and $l_b$ is denoted as $\theta_f$; using the simplified model for terrain contact, calculating $\theta_r$ and $\theta_f$ during traveling, and mapping same to the swing-arm joint angles $\theta_R$ and $\theta_F$ to complete the control of the swing arms.

5. The motion control method for the adaptive self-reconfigurable pipeline robot based on environmental perception according to claim 4, wherein solving $\theta_r$ and $\theta_f$ in the step 3 is subjected to the following constraints: 1) at least two points on three simplified boundary lines are in contact with the terrain;

2) The three simplified boundary lines are free from interference with the terrain; and 3) A vertical line of the robot's center of gravity is between $P_{br}$ and $P_{bf}$:

in response to $\theta_r$ and $\theta_f$ have a plurality of solutions, taking a state of the robot with a lowest height of the center of gravity as an optimal state; after obtaining the swing-arm angle sequence in a discrete state during obstacle crossing, calculating a motion cost according to a swing-arm angle change rate, reducing a cumulative cost through a dynamic programming algorithm, obtaining an optimal discrete swing-arm angle sequence, and performing sampling and smoothing on the generated optimal discrete swing-arm state sequence through a Bezier curve; and sending a smoothed reference path and swing-arm angle to the MPC motion controller.

6. The motion control method for the adaptive self-reconfigurable pipeline robot based on environmental perception according to claim 1, wherein the step 4 comprises:

deriving ESKF motion equations for a nominal state and an error state in discrete time using an IMU measurement model, then performing an ESKF prediction, comprising predictions of the nominal state and the error state, obtaining left and right crawler speeds through an encoder in an update stage, observing and measuring a distance between a pipeline joint and a vehicle body in order to mitigate cumulative errors, and completing the update of a covariance matrix and the error state;

calculating the distance between the pipeline joint and the vehicle body according to boundary line features of the pipeline joint extracted by the depth camera in combination with rectangular constraints and the camera projection model; installing the TOF modules for distance measurement on the left and right sides and the top of the robot and configured for collision warning; and inputting the real-time position and state of the robot and a collision warning signal into the MPC motion controller.

7. The motion control method for the adaptive self-reconfigurable pipeline robot based on environmental perception according to claim 1, wherein the step 5 comprises:

setting a system state as $[x = x_r, y_r, z_r, \theta_{yaw}, \theta_{pitch}, \theta_F, \theta_R]^T$, wherein $x_r$, $y_r$, $z_r$, $\theta_{yaw}$, $\theta_{pitch}$ represent 3D spatial coordinates, a yaw angle, and a pitch angle of the robot respectively, wherein a system input is denoted as $u = [v_L, v_R, \Delta\theta_F, \Delta\theta_R]^T$, wherein $v_L$, $v_R$, $\Delta\theta_F$, $\Delta\theta_R$ represent an input velocity of a left crawler, an input velocity of a right crawler, an angular increment of the front swing arm, and an angular increment of the rear swing arm; a reference state is denoted as $X_{ref} = \{x_0, x_1, x_2, \ldots, x_{end}\}$, wherein $x_0$ signifies an initial state of the system, and $x_{end}$ represents a desired final state of the system;

predicting states of the system in next N cycles at a moment i through the kinematic model f of the dual-swing-arm crawler robot according to the formula $$X_{pre}_{i+1 \to i+N} = f(u_{i \to i+N-1}, x_i),$$

constructing the quadratic objective function according to differences between predicted states and reference states, and iteratively optimizing to minimize the differences, so as to obtain an optimized system input $u_{i \to i+N-1}$ for N cycles; in the process of updating states of the system, using the position and state of the robot obtained in the step 4 to obtain more accurate 3D spatial coordinates of the robot; and optimizing the system input u through a sliding window in real time.

\* \* \* \* \*